No. 646,252. Patented Mar. 27, 1900.
F. ANDREE.
CENTRIFUGAL SHREDDING AND PULVERIZING MACHINE.
(Application filed Aug. 29, 1898.)
(No Model.)
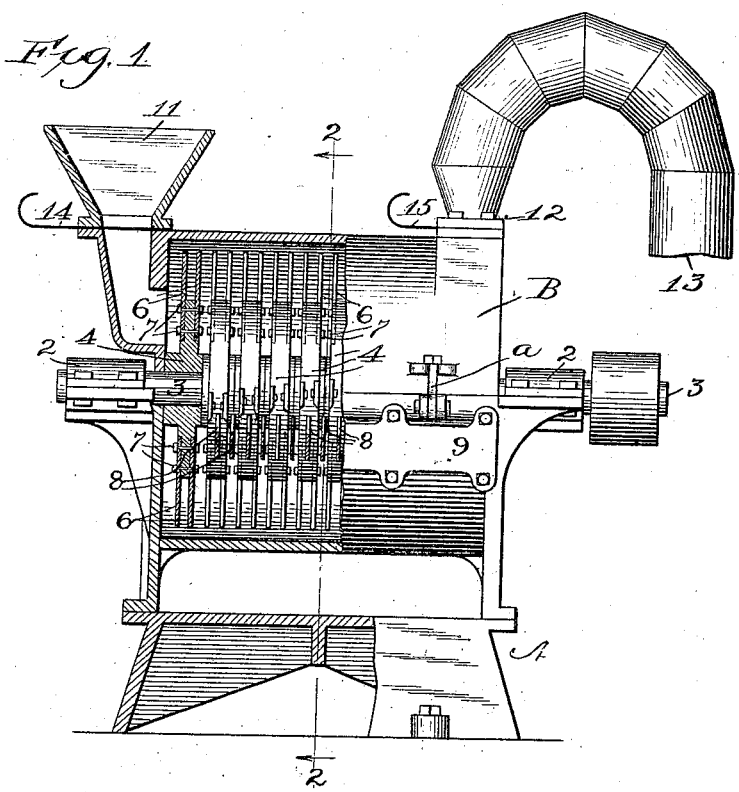
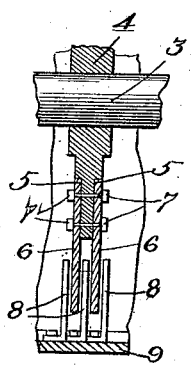
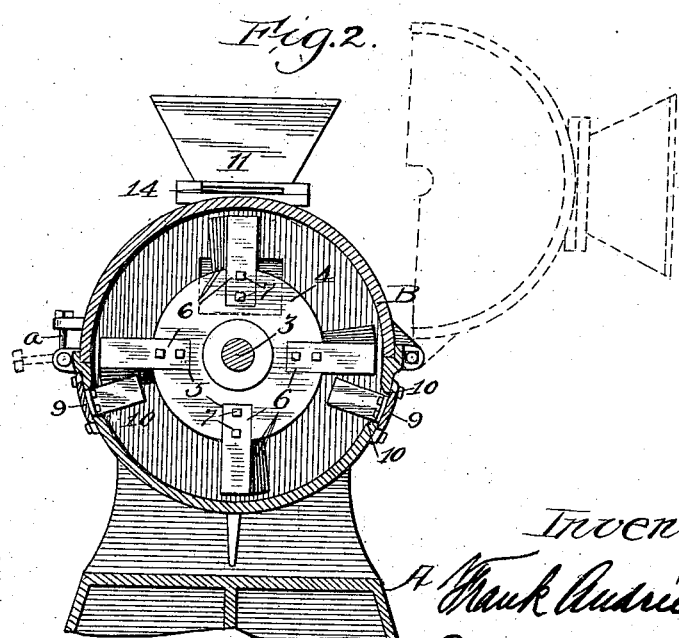

UNITED STATES PATENT OFFICE.

FRANK ANDREÉ, OF CHICAGO, ILLINOIS.

CENTRIFUGAL SHREDDING AND PULVERIZING MACHINE.

SPECIFICATION forming part of Letters Patent No. 646,252, dated March 27, 1900.

Application filed August 29, 1898. Serial No. 689,743. (No model.)

*To all whom it may concern:*

Be it known that I, FRANK ANDREÉ, a citizen of the United States, residing at Chicago, in the county of Cook and State of Illinois, have invented certain new and useful Improvements in Centrifugal Shredding and Pulverizing Machines; and I do hereby declare the following to be a full, clear, and exact description of the invention, such as will enable others skilled in the art to which it appertains to make and use the same.

My invention relates to a novel construction in a centrifugal shredding and pulverizing machine, the object being to provide a machine of this character by means of which feathers or other like light fibrous material can be easily and quickly cut into shreds and brittle substances pulverized; and it consists in the features of construction and combinations of parts hereinafter fully described and claimed.

In the accompanying drawings, illustrating my invention, Figure 1 is a side elevation, partially in longitudinal section, of a machine constructed in accordance with my invention. Fig. 2 is a transverse section of the same on the line 2 2 of Fig. 1. Fig. 3 is a detail sectional view on an enlarged scale, showing one of the disks and the manner of mounting the knives thereon.

Referring now to said drawings, A indicates the bed or base of my shredding-machine, upon which the cylindrical casing B is supported. Said casing B is preferably made in two parts, the lower of which is secured upon said base A and the upper of which is hinged to said lower portion. As it may be raised on its hinges to the position shown in dotted lines in Fig. 2, the working parts of the machine are obviously placed within easy reach for repair. Said upper portion of said cylinder is held in place upon said lower portion by means of suitable clamping devices a, as shown. Mounted upon said lower portion of said cylindrical casing at the ends of the same are bearings 2, in which a shaft 3 is journaled, which passes longitudinally through the center of said cylindrical casing B. Rigidly mounted upon said shaft 3, within said cylinder B, are a plurality of disks 4, on both sides of which radial grooves 5 are cut, in which knives 6 are adapted to fit and to be rigidly secured by means of bolts 7 passing through said disks and through the knives on opposite sides thereof. Knives 8 are mounted upon the inner face of said lower portion of said casing B and extend radially inwardly from same, being so placed that each of said knives 6 will pass between two of said knives 8, and vice versa. Said knives 8 are mounted upon plates 9, adapted to be secured to said lower portion of said casing, said knives passing through the recesses 10 in said casing, which are closed by said plates 9. Said disks 4 are each provided with a hub, which projects outwardly therefrom, the hubs of adjacent disks abutting against each other and thus separating said disks by spaces which are practically equal in width to the spaces between the knives on each of said disks. Said disks 4 are also preferably so mounted with relation to each other that the knives 6 on one disk are not directly in alinement with those on the adjoining disk, but form a slightly-spiral row which varies from parallel with an axial plane by about the width of one knife, so that as each row of knives 6 passes through a row of knives 8 each pair of knives 6 will enter the row of knives 8 slightly behind the adjacent pair. In this manner a jar or sudden strain on the shaft is avoided. The material to be shredded is introduced into the cylinder through the trough or passage 11, which communicates with said cylinder adjacent the center thereof, and passes lengthwise through said cylinder. During its passage it is acted upon by said knives, which revolve at a very high speed, so that by the time it has reached the other or discharge end of said cylinder it is cut into fine shreds and is discharged through the discharge-opening 12 in said cylinder, which communicates with the pipe 13, through which the shredded material is led to any desired receptacle. The said discharge-opening is made in the cylindrical wall of the cylinder, so that the air-currents produced in said cylinder by the revolution of said knives and the parts to which they are secured will be discharged through said pipe 13 by centrifugal force and carry the light shreds with them. I have provided valves 14 and 15 to control the amount of material fed to and discharged from said cylinder, and thus by setting said valve 15 so as to reduce the area of the discharge-opening the material can be retained in said cylinder for any desired length of time and thus reduced to any desired degree of fineness.

I claim as my invention—

In a machine of the kind specified, a horizontal cylindrical casing divided longitudinally into two sections hinged together, a shaft extending centrally through said casing and journaled in bearings carried by the end walls of the lowermost section, a plurality of parallel disks mounted upon said shaft within said casing, a plurality of pairs of parallel radial knives carried by each of said disks, a plurality of rigid radially inwardly extending knives carried by said lowermost section and adapted to alternate with said knives on said disks, a hopper mounted upon one end of the uppermost section, a chute leading from said hopper to an opening in the end wall of said upper section adjacent the center thereof, a valve interposed between said hopper and said chute, an opening in the top of said upper section at its other end, a valve controlling said opening, and a pipe leading from said opening, substantially as described.

In testimony whereof I affix my signature in presence of two witnesses.

FRANK ANDREÉ.

Witnesses:
RUDOLPH WM. LOTZ,
ERWIN J. LOTZ.